(12) United States Patent
Oh et al.

(10) Patent No.: US 11,403,515 B2
(45) Date of Patent: Aug. 2, 2022

(54) SPIKE NEURAL NETWORK CIRCUIT INCLUDING RADIATION SOURCE

(71) Applicant: Electronics and Telecommunications Research Institute, Daejeon (KR)

(72) Inventors: Kwang IL Oh, Daejeon (KR); Byounggun Choi, Daejeon (KR); Tae Wook Kang, Daejeon (KR); Sung Eun Kim, Daejeon (KR); Seong Mo Park, Daejeon (KR); Jae-Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 753 days.

(21) Appl. No.: 16/377,983

(22) Filed: Apr. 8, 2019

(65) Prior Publication Data
US 2019/0311244 A1 Oct. 10, 2019

(30) Foreign Application Priority Data

Apr. 9, 2018 (KR) .................. 10-2018-0041233
Jul. 27, 2018 (KR) .................. 10-2018-0088187

(51) Int. Cl.
*G06N 3/04* (2006.01)
*G06N 3/06* (2006.01)
*G06N 3/063* (2006.01)

(52) U.S. Cl.
CPC .......... *G06N 3/049* (2013.01); *G06N 3/063* (2013.01)

(58) Field of Classification Search
CPC ................................................ G06N 3/049
See application file for complete search history.

(56) References Cited

U.S. PATENT DOCUMENTS 9,053,428 B2 6/2015 Hunzinger et al.
2002/0167332 A1* 11/2002 Bernstein ............... G06N 3/063
326/36

(Continued)

FOREIGN PATENT DOCUMENTS

KR 10-2001-0064424 A 7/2001
KR 10-2006-0063726 A 6/2006

(Continued)

OTHER PUBLICATIONS

Nawrocki, Robert A., Richard M. Voyles, and Sean E. Shaheen. "A mini review of neuromorphic architectures and implementations." IEEE Transactions on Electron Devices 63.10 (2016): 3819-3829. (Year: 2016).*

(Continued)

*Primary Examiner* — Hal Schnee
(74) *Attorney, Agent, or Firm* — Rabin & Berdo, P.C.

(57) ABSTRACT

Provided is a spike neural network circuit. The spike neural network circuit includes an axon configured to generate an input spike signal, a synapse including a first transistor for outputting a current according to a weight and a second transistor connected to the first transistor and outputting the current according to an input spike signal, a neuron configured to compare a value according to the current output from the synapse with a reference value and generate an output spike signal based on a comparison result, and a radiation source attached to a substrate on which the synapse is formed, configured to output radiation particles to the synapse, and configured to increase magnitudes of threshold voltages of the first and second transistors of the synapse.

15 Claims, 15 Drawing Sheets

(56) References Cited

U.S. PATENT DOCUMENTS

| | | |
|---|---|---|
| 2006/0119592 A1 | 6/2006 | Wang et al. |
| 2018/0114578 A1 | 4/2018 | Ishizu et al. |
| 2018/0129935 A1 | 5/2018 | Kim et al. |
| 2018/0131946 A1 | 5/2018 | Lee et al. |
| 2018/0225567 A1* | 8/2018 | Bedell .................... G06N 3/04 |

FOREIGN PATENT DOCUMENTS

| | | |
|---|---|---|
| KR | 10-1512370 B1 | 4/2015 |
| KR | 10-1596656 B1 | 2/2016 |

OTHER PUBLICATIONS

Qin, Shuchao, et al. "A light-stimulated synaptic device based on graphene hybrid phototransistor." 2D Materials 4.3 (2017): 035022. (Year: 2017).*

* cited by examiner

US 11,403,515 B2

SPIKE NEURAL NETWORK CIRCUIT INCLUDING RADIATION SOURCE

CROSS-REFERENCE TO RELATED APPLICATIONS

This U.S. non-provisional patent application claims priority under 35 U.S.C. § 119 of Korean Patent Application Nos. 10-2018-0041233, filed on Apr. 9, 2018, and 10-2018-0088187, filed on Jul. 27, 2018, the entire contents of which are hereby incorporated by reference.

BACKGROUND

The present disclosure herein relates to a spike neural network circuit, and more particularly, to a spike neural network circuit including a radiation source.

An artificial neural network (ANN) may process data or information in a manner similar to a biological neural network. Unlike perceptron based neural networks or convolution based neural networks, a spike signal having a pulse shape that toggles for a short period of time may be transferred, rather than a specific level of signal being transferred, in the spike neural network.

The spike neural network circuit may include a plurality of transistors operating depending on a spike signal. The number of the plurality of transistors may increase according to the depth of the spike neural network circuit or the amount of information processed by the spike neural network circuit. As fine processing technology develops, the leakage current generated in the plurality of transistors may increase. As a result, arithmetic errors may occur in the spike neural network circuit.

SUMMARY

The present disclosure is to provide a spike neural network circuit including a radiation source.

An embodiment of the inventive concept provides a spike neural network circuit including: an axon configured to generate an input spike signal; a synapse including a first transistor for outputting a current according to a weight and a second transistor connected to the first transistor and outputting the current according to an input spike signal; a neuron configured to compare a value according to the current output from the synapse with a reference value and generate an output spike signal based on a comparison result; and a radiation source attached to a substrate on which the synapse is formed, configured to output radiation particles to the synapse, and configured to increase magnitudes of threshold voltages of the first and second transistors of the synapse.

In an embodiment of the inventive concept, a spike neural network circuit includes: an axon circuit configured to generate a plurality of input spike signals; a synapse circuit including transistors outputting a plurality of weights according to the plurality of input spike signals; a neuron circuit configured to compare a value determined by the weights output from the synapse circuit with a reference value and generate output spike signals based on a comparison result; and a radiation source attached to a substrate on which the synapse circuit is formed, configured to output radiation particles to the synapse circuit, and configured to increase magnitudes of threshold voltages of the transistors of the synapse circuit.

BRIEF DESCRIPTION OF THE FIGURES

The accompanying drawings are included to provide a further understanding of the inventive concept, and are incorporated in and configure a part of this specification. The drawings illustrate exemplary embodiments of the inventive concept and, together with the description, serve to explain principles of the inventive concept. In the drawings.

DETAILED DESCRIPTION

In the following, embodiments of the inventive concept will be described in detail so that those skilled in the art easily carry out the inventive concept.

The inventive concept relates to a circuit implemented in a semiconductor device for performing a computation of a neural network. The neural network of the inventive concept may be an artificial neural network (ANN) capable of processing data or information in a manner similar to a biological neural network. Neural networks may include a plurality of layers including artificial neurons similar to biological neurons and synapses connecting the plurality of layers. Hereinafter, a spike neural network that processes a spike signal having a pulse shape that toggles for a short period of time will be exemplarily described. However, circuits according to an embodiment of the inventive concept are not limited to a spike neural network and may be used to implement another neural network.

Figure 1:
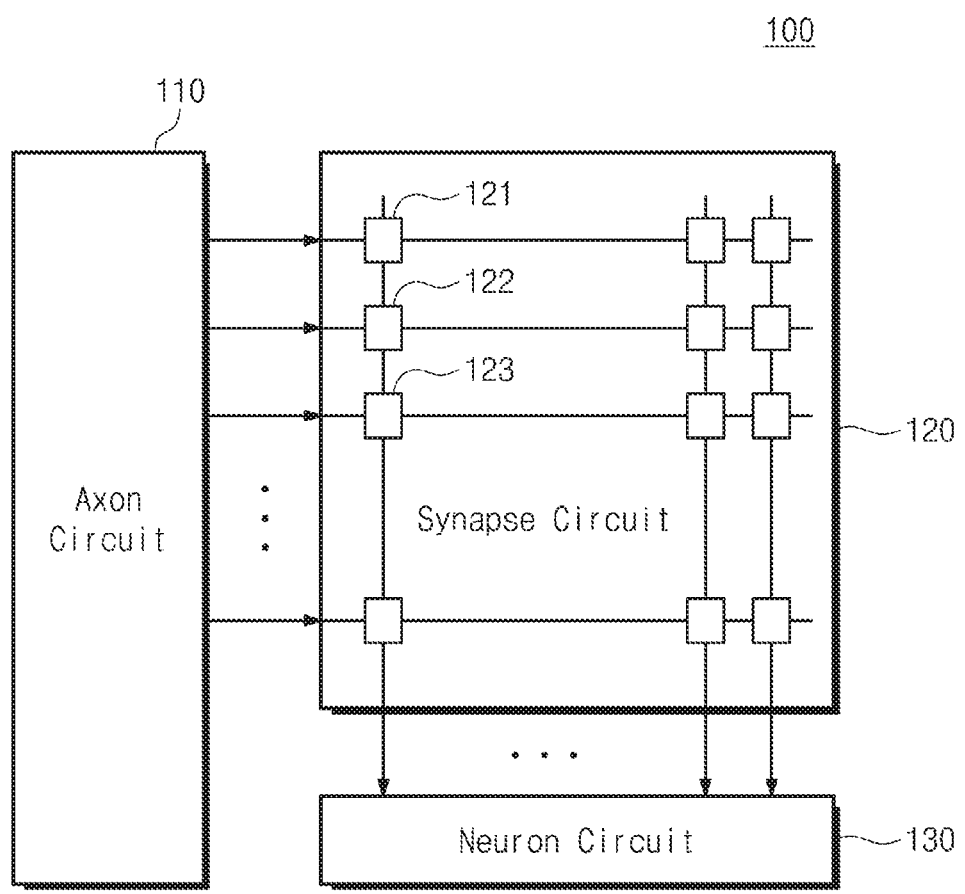
FIG. 1 is a block diagram exemplarily showing a spike neural network circuit according to an embodiment of the inventive concept.

FIG. 1 is a block diagram exemplarily showing a spike neural network circuit according to an embodiment of the inventive concept. The spike neural network circuit 100 may include an axon circuit 110, a synapse circuit 120, and a neuron circuit 130.

The axon circuit 110 may include axons generating input spike signals. The axon of the axon circuit 110 may function to output a signal to other neurons like the axon of the biological neural network. For example, each of the axons of the axon circuit 110 may generate an input spike signal based on data or information input to the spike neural network circuit 100 from the outside. In another example, each of the axons of the axon circuit 110 may first receive the output spike signals (or, feedback) output from the neuron circuit 130 according to input spike signals transmitted to the synapse circuit 120, and may generate a new input spike signal based on the output spike signals. The input spike signal may be a pulse signal that toggles for a short period of time. The axon circuit 110 may generate and transmit input spike signals to the synapse circuit 120.

The synapse circuit 120 may connect the axon circuit 110 and the neuron circuit 130. The synapse circuit 120 may include synapses that determine whether the axons of the axon circuit 110 and the neurons of the neuron circuit 130 are connected and the connection strength. Each of the synapses may have a weight. Each of the synapses may receive an input spike signal, and a weight may be applied to the input spike signal. The weight may be a numerical value indicating the correlation between axon and neuron described above, the connection strength between the axons of the axon circuit 110 and the neurons of the neuron circuit 130, the correlation of (following) neurons of the neuron circuit 130 with respect to the input spike signal, and the like. The synapse circuit 120 may output the weights to the neuron circuit 130 according to the input spike signals.

The spike neural network circuit 100 may include a plurality of layers each including a plurality of neurons. Some synapses of the synapse circuit 120 may represent correlation of the first layer and the second layer and other synapses of the synapse circuit 120 may represent correlation of the third layer and the fourth layer. That is, the synapses of the synapse circuit 120 may represent correlations between the various layers.

Referring to FIG. 1, synapses are shown to be disposed on a two-dimensional array. The input spike signals may be transmitted in a first direction from the axon circuit 110 to the synapse circuit 120. As the result of weighting the input spike signal, it may be transmitted in a second direction from the synapse circuit 120 to the neuron circuit 130. For example, the first direction and the second direction may be perpendicular to each other. However, unlike what is shown in FIG. 1, the synapses 121 to 123 may be arranged on a three-dimensional array.

The neuron circuit 130 may receive the results of applying the weights to the input spike signals from the synapse circuit 120. The neuron circuit 130 may function to receive signals output from another neuron like the dendrites of the biological neural network. The neuron circuit 130 may compare the reference value with a value determined by the weights output from the synapse circuit 120. More specifically, the neuron circuit 130 may compare the accumulated sum of the output results of the synapse circuit 120 with the reference value (or a threshold value), and if the accumulated sum exceeds the reference value, may generate output spike signals (i.e., fire of neurons). The output spike signals of the neuron circuit 130 may be provided back to the axon circuit 110 or may be output to the outside of the spike neural network circuit 100 or may be output to other components of the spike neural network circuit 100.

Figure 2:
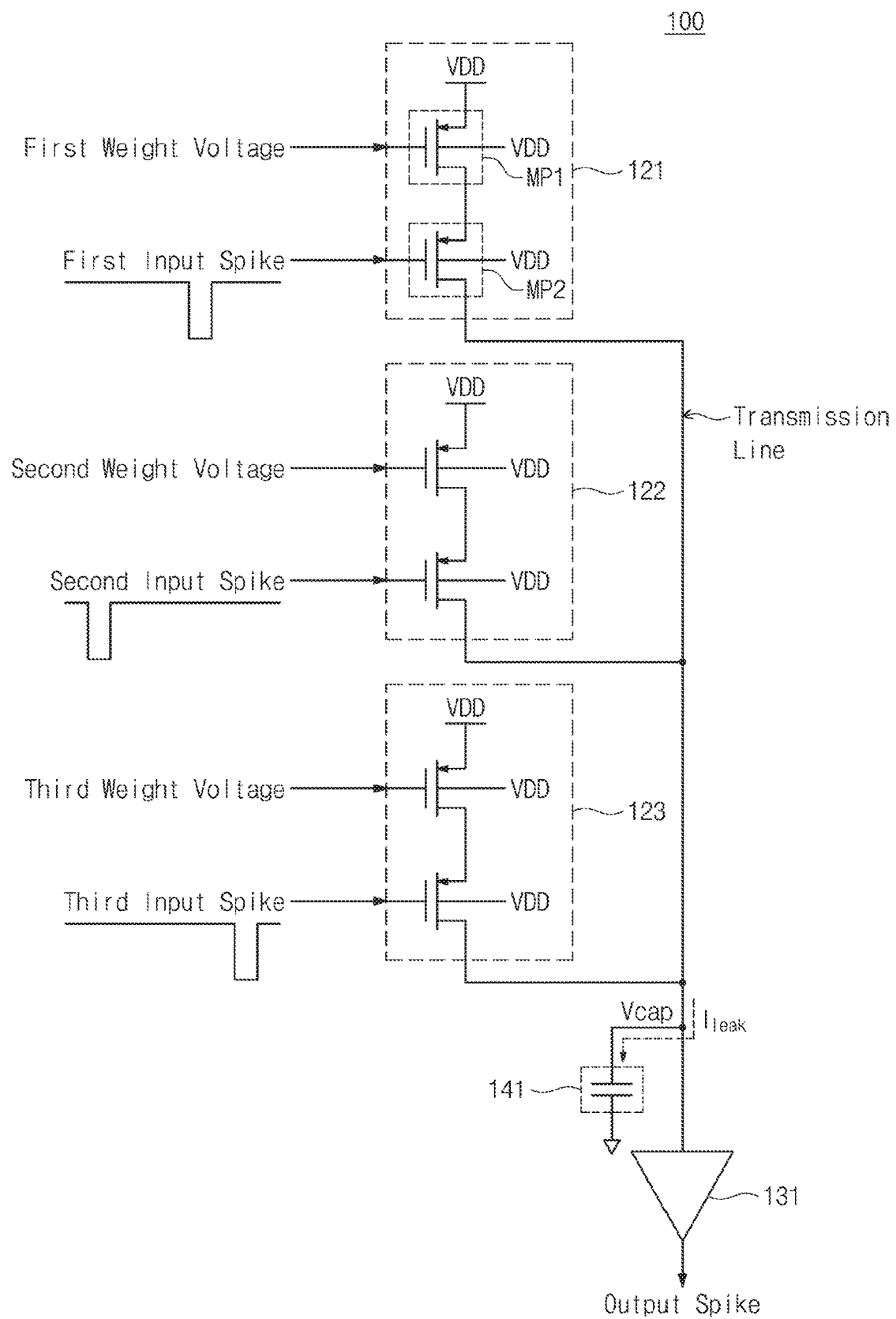
FIG. 2 is a block diagram that more specifically illustrates synapses of the synapse circuit of FIG. 1 according to an embodiment.

FIG. 2 is a block diagram that more specifically illustrates synapses of the synapse circuit of FIG. 1 according to an embodiment. FIG. 2 will be described with reference to FIG. 1. For convenience of description, the illustration of the axon circuit 110 is omitted, only some synapses 121, 122, and 123 of the synapse circuit 120 are shown, and only one neuron 131 of the neuron circuit 130 is shown in FIG. 2.

The first synapse 121 may include a first transistor MP1 and a second transistor MP2. The first transistor MP1 may receive the first weight voltage through the gate terminal. The first weighting voltage may be a value indicating the first weight of the first synapse 121 and may have, for example, an analog voltage level. The first transistor MP1 may be connected to the first power supply voltage VDD through a source terminal. The drain terminal of the first transistor MP1 may be connected to the source terminal of the second transistor MP2. The first transistor MP1 may be a current source that outputs a current from the first power supply voltage VDD to the second transistor MP2 according to the first weighting voltage. The amount of current supplied to the second transistor MP2 from the first power supply voltage VDD through the first transistor MP1 may correspond to the first weight of the first synapse 121.

The second transistor MP2 may receive the first input spike signal through the gate terminal. The source terminal of the second transistor MP2 may be connected to the drain terminal of the first transistor MP1. The drain terminal of the second transistor MP2 may be connected to the transmission line. The second transistor MP2 may be a switch that is turned on or off according to the first input spike signal. When being turned on according to the first input spike signal, the second transistor MP2 may output the current output from the first transistor MP1 to the transmission line according to the first input spike signal.

Each of the first transistor MP1 and the second transistor MP2 may be a p-channel metal-oxide semiconductor (PMOS). When the signal input to the gate terminal has a relatively low voltage level (for example, GND level), each of the first transistor MP1 and the second transistor MP2 may be turned on and when the signal input to the gate terminal has a relatively high voltage level (e.g., VDD level), may be turned off. Referring to FIG. 2, the second transistor MP2 may be turned on when the first input spike has a relatively low voltage level. A body terminal or a bulk terminal of each of the first transistor MP1 and the second transistor MP2 may be connected to a first power supply voltage VDD.

The second synapse 122 may be implemented in the same manner as the first synapse 121. The second synapse 122 may receive a second weight voltage corresponding to the second weight and receive a second input spike signal. The third synapse 123 may be implemented in the same manner as the first synapse 121. The third synapse 123 may receive a third weight voltage corresponding to the third weight and receive a third input spike signal. Here, the first to third weight voltages may be the same or different from each other. Also, the first to third input spike signals may be the same or different from each other.

The neuron 131 may compare the reference value with a value according to the currents output from the first to third synapses 121 to 123. For example, the neuron 131 may compare the voltage Vcap of the capacitor 141 with the reference voltage. The neuron 131 may generate an output spike signal based on the comparison result. The neuron 131 may output an output spike signal if the voltage Vcap of the capacitor 141 is greater than the reference voltage (neuron firing).

The spike neural network circuit 100 may include a capacitor 141 where charges are accumulated by the currents output from the first to third synapses 121 to 123. The capacitor 141 may be charged by the currents output from the first to third synapses 121 to 123 and corresponding to the first to third weights. Of course, the spike neural network circuit 100 may further include capacitors where charges are accumulated by the currents output from other synapses. The voltage Vcap of the capacitor 141 may be a value depending on the currents output from the first to third synapses 121 to 123. The voltage Vcap of the capacitor 141 may be a value determined by the first to third weights output from the first to third synapses 121 to 123 depending on the first to third input spike signals. The voltage Vcap of the capacitor 141 may be provided to the neuron 131. Although it is shown in FIG. 2 that the number of synapses connected to the capacitor 141 through the transmission line is three, the scope of the inventive concept is not limited thereto. The capacitor 141 may be referred to as a membrane capacitor.

In an embodiment, the spike neural network circuit 100 may include a discharge circuit (not shown) that discharges the capacitor 141 periodically or aperiodically. Before the first to third weights output from the first to third synapses 121 to 123 are input to the capacitor 141 depending on the first to third input spike signals, the discharge circuit may discharge the capacitor 141 fully.

In an embodiment, the capacitor 141 may be implemented as a passive element coupled to a transmission line, a transmission line, or a combination thereof. If the spike neural network circuit 100 does not include a passive element, the capacitance of the capacitor 141 may be determined based on the capacitance of the transmission line itself. If the spike neural network circuit 100 includes a passive element, the capacitance of the capacitor 141 may be determined based on the capacitance of the passive element or the capacitance of the transmission line.

Referring to FIG. 2, the first to third input spike signals may have a relatively low voltage level for a relatively short section (time) and a relatively high voltage level for a remaining section (time). During periods when the first to third spike signals are not activated (i.e., during a section where the first to third input spike signals have relatively high voltage levels), the second transistors of the first to third synapses 121 to 123 may be turned off.

Since the second transistors of the first to third synapses 121 to 123 have a finite resistance value in the turn-off state, charges may be accumulated in the capacitor 141 by the leakage current $I_{leak}$ output from the second transistors of the first to third synapses 121 to 123. The leakage current $I_{leak}$ may be smaller than the sum of the currents corresponding to the first to third weights. However, the leakage current $I_{leak}$ may affect the voltage Vcap of the capacitor 141 and increase the voltage Vcap of the capacitor 141. As the number of synapses connected to the transmission line increases, the leakage current $I_{leak}$ may also increase. A computation error may occur in the spike neural network circuit 100 due to the leakage current $I_{leak}$. The spike neural network circuit 100 of the inventive concept may reduce the leakage current $I_{leak}$ occurring in the synapses and minimize the computation error. Also, the power consumption of the spike neural network circuit 100 may be improved due to the reduction of the leakage current $I_{leak}$.

Figure 3:
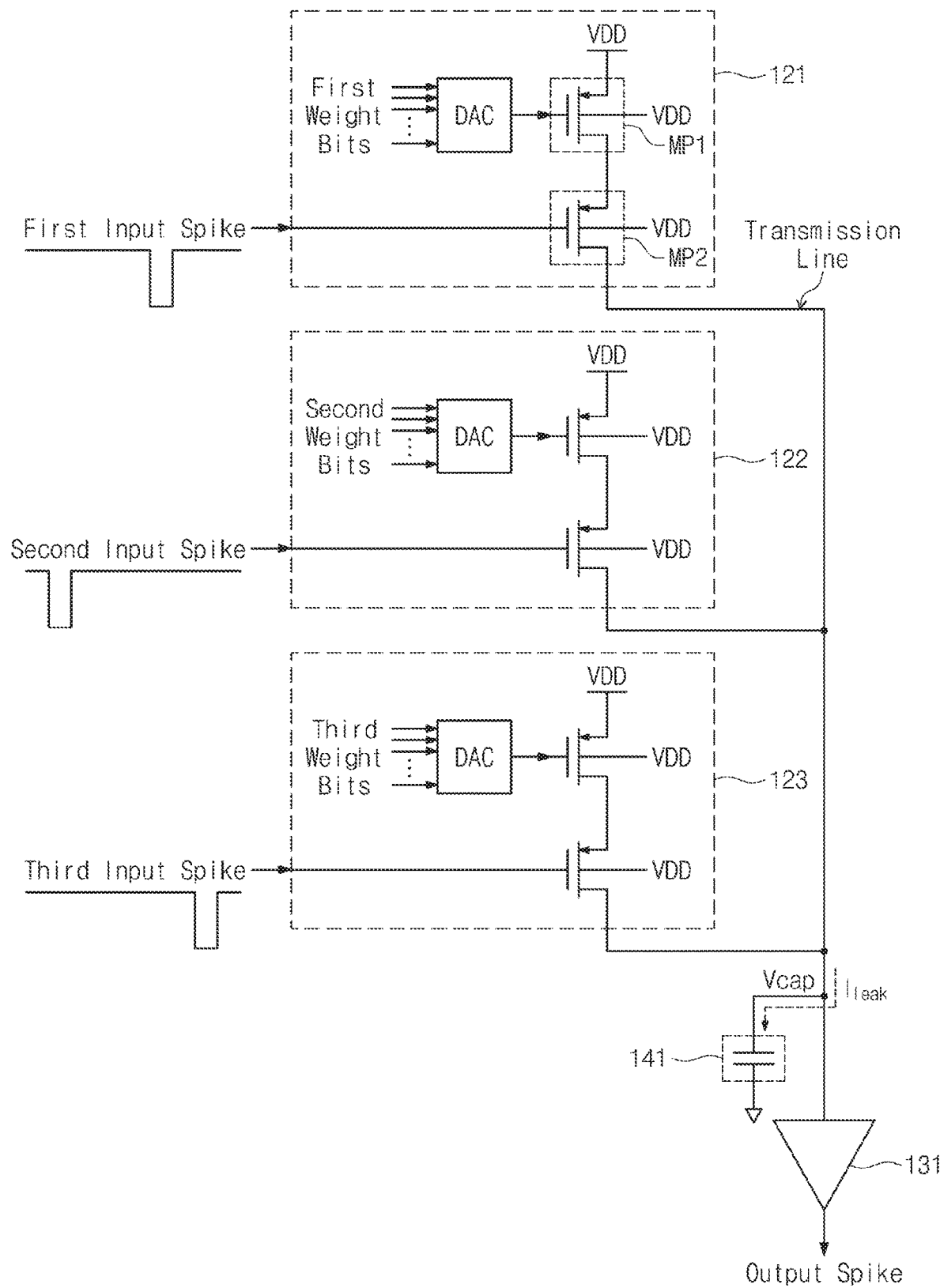
FIG. 3 is a block diagram that more specifically illustrates synapses of the synapse circuit of FIG. 1 according to another embodiment.

FIG. 3 is a block diagram that more specifically illustrates synapses of the synapse circuit of FIG. 1 according to another embodiment. FIG. 3 will be described with reference to FIGS. 1 and 2. The difference between the spike neural network circuit 100 of FIG. 3 and the spike neural network circuit 100 of FIG. 2 will be described. Each of the first to third synapses 121 to 123 of the spike neural network circuit 100 may further include a digital to analog converter (DAC).

The DAC of the first synapse 121 may receive the first weight bits and output a voltage (the first weight voltage of FIG. 2) having an analog level corresponding to the first weight bits to the first transistor MP1. The DAC of the second synapse 122 may receive the second weight bits and output a voltage (the second weight voltage of FIG. 2) having an analog level corresponding to the second weight bits to the first transistor MP1. The DAC of the third synapse 123 may receive the third weight bits and output a voltage (the third weight voltage of FIG. 1) having an analog level corresponding to the third weight bits to the first transistor MP1.

In the embodiment, as shown in FIG. 3, each of the synapses of the synapse circuit 120 may further include a DAC as well as the first and second transistors MP1 and MP2. Also, each of the synapses of the synapse circuit 120 may further include a register memory cells (e.g., static random access memory (SRAM), dynamic random access memory (DRAM) cells, latch, NAND flash memory cells, NOR flash memory cells, resistive random access memory (RRAM) cells, ferroelectric random access memory (FRAM) cells, phase change random access memory (PRAM) cells, magnetic random access memory (MRAM) cells, and the like, for storing weight bits.

In another embodiment, as shown in FIG. 2, each of the synapses of the synapse circuit 120 includes only the first and second transistors MP1 and MP2. The DACs and the registers or memory cells storing weight bits described above are included in the semiconductor device in which the spike neural network circuit 100 is implemented but may be separated from the synapse circuit 120. In this case, the DACs separated from the synapse circuit 120 may transmit weight voltages to the synapse circuit 120, or the registers or memory cells storing the weight bits may transmit the weight bits to the synapse circuit 120. In either case, each of the first transistors MP1 of the synapses of the synapse circuit 120 may receive a weight voltage corresponding to the weight.

Figure 4:
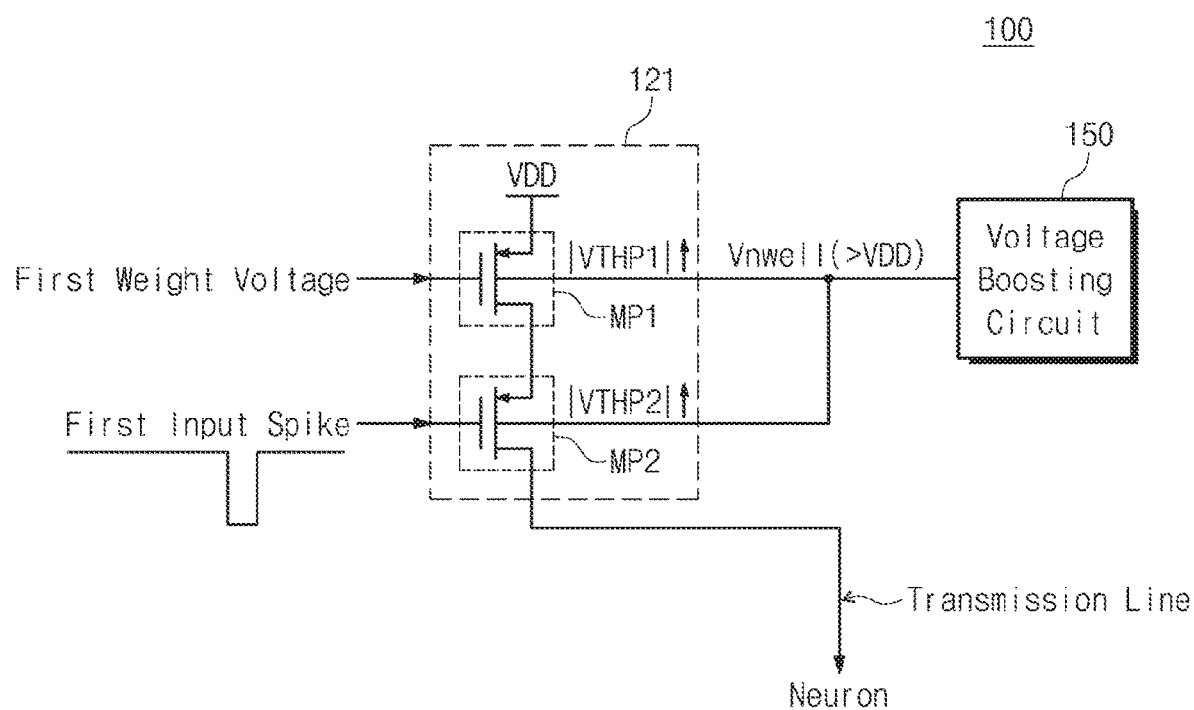
FIG. 4 illustrates a case where the spike neural network circuit of FIG. 2 further includes a voltage boosting circuit.

FIG. 4 illustrates a case where the spike neural network circuit of FIG. 2 further includes a voltage boosting circuit. FIG. 4 will be described with reference to FIG. 2. Only the first synapse 121 is shown in FIG. 4 and the illustration of the other components of the spike neural network circuit 100 is omitted. The spike neural network circuit 100 may further include a voltage boosting circuit 150 (referring to as voltage converting circuit).

The voltage boosting circuit 150 may generate a high voltage Vnwell higher (greater) than the first power supply voltage VDD. The voltage boosting circuit 150 may include a charge pump that generates a high voltage Vnwell. The high voltage Vnwell may be provided to the body terminals of the first and second transistors MP1 and MP2 of the first synapse 121. The magnitudes |VTHP1| and |VTHP2| of the threshold voltages of the first and second transistors MP1 and MP2 when the body voltage of the first and second transistors MP1 and MP2 is a high voltage Vnwell may be greater than the magnitudes |VTHP1| and |VTHP2| of the threshold voltages of the first and second transistors MP1 and MP2 when the body voltage of the first and second transistors MP1 and MP2 is the first power supply voltage VDD. The voltage boosting circuit 150 may increase the magnitudes |VTHP1| and |VTHP2| of the threshold voltages of the first and second transistors MP1 and MP2 by using or by supplying the high voltage Vnwell. Therefore, the leakage current generated in the first and second transistors MP1 and MP2 may be reduced. The computation error that may occur in the operation of comparing the voltage Vcap of the capacitor 141 with the reference voltage may also be reduced.

Figure 5:
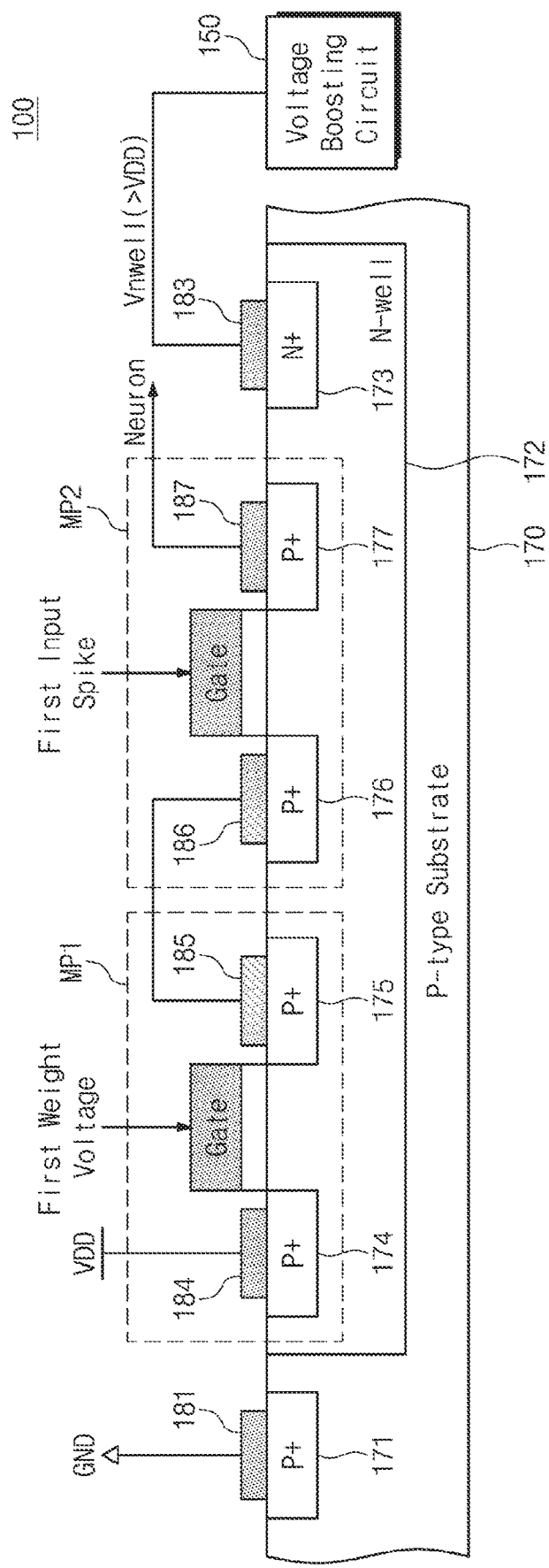
FIG. 5 illustrates a cross-section of the spike neural network circuit of FIG. 4.

FIG. 5 illustrates a cross-section of the spike neural network circuit of FIG. 4. The first transistor MP1, the second transistor MP2 and the voltage boosting circuit 150 of the spike neural network circuit 100 may be implemented in the P-type substrate 170.

A P-type dopant may be doped in the P-type substrate 170. A heavily doped P-type diffusion area (or P+ area 171) may be formed in the P-type substrate 170. An ohmic contact 181 may be formed on the heavily doped P-type diffusion area 171. The P-type substrate 170 may receive a second power supply voltage GND through the heavily doped P-type diffusion area 171 and the ohmic contact 181. An N-well area 172 may be formed in the P-type substrate 170. An N-type dopant may be doped in the N-well area 172. A heavily doped N-type diffusion area (or N+ area 173) may be formed in the N-well area 172. An ohmic contact 183 may be formed on the heavily doped N-type diffusion area 173. The N-well area 172 may receive a high voltage Vnwell higher than the first power supply voltage VDD through the heavily doped N-type diffusion area 173 and the ohmic contact 183. The high voltage Vnwell of the N-well area 172 may increase the magnitudes |VTHP1| and |VTHP2| of the threshold voltages of the first and second transistors MP1 and MP2.

Heavily doped P-type diffusion areas 174 to 177 may be formed in the N-well area 172. Ohmic contacts 184 to 187 may be formed on the heavily doped P-type diffusion areas 174 to 177, respectively. Polysilicon operating as a gate terminal may be formed on the P-type substrate 170 between the heavily doped P-type diffusion areas 174 and 175. A layer of silicon dioxide (SiO$_2$) for separating the gate terminal from the P-type substrate 170 may be further formed between the gate terminal and the P-type substrate 170. The heavily doped P-type diffusion areas 174 and 175, the ohmic contacts 184 and 185, a layer of silicon dioxide (SiO$_2$), and a gate terminal may configure a first transistor MP1. Similarly, the heavily doped P-type diffusion areas 176 and 177, the ohmic contacts 186 and 187, a layer of silicon dioxide (SiO$_2$), and a gate terminal may configure a second transistor MP2. The ohmic contact 183 may operate as the body terminals of the first and second transistors MP1 and MP2.

As described with reference to FIG. 2, a first power supply voltage VDD is provided to the ohmic contact 184 operating as the source terminal of the first transistor MP1. The ohmic contact 185 operating as the drain terminal of the first transistor MP1 and the ohmic contact 186 operating as the source terminal of the second transistor MP2 are electrically connected to each other through wiring. The ohmic contact 187 operating as the drain terminal of the second transistor MP2 may be electrically connected to the transmission lines of FIGS. 2 and 4.

Figure 6:
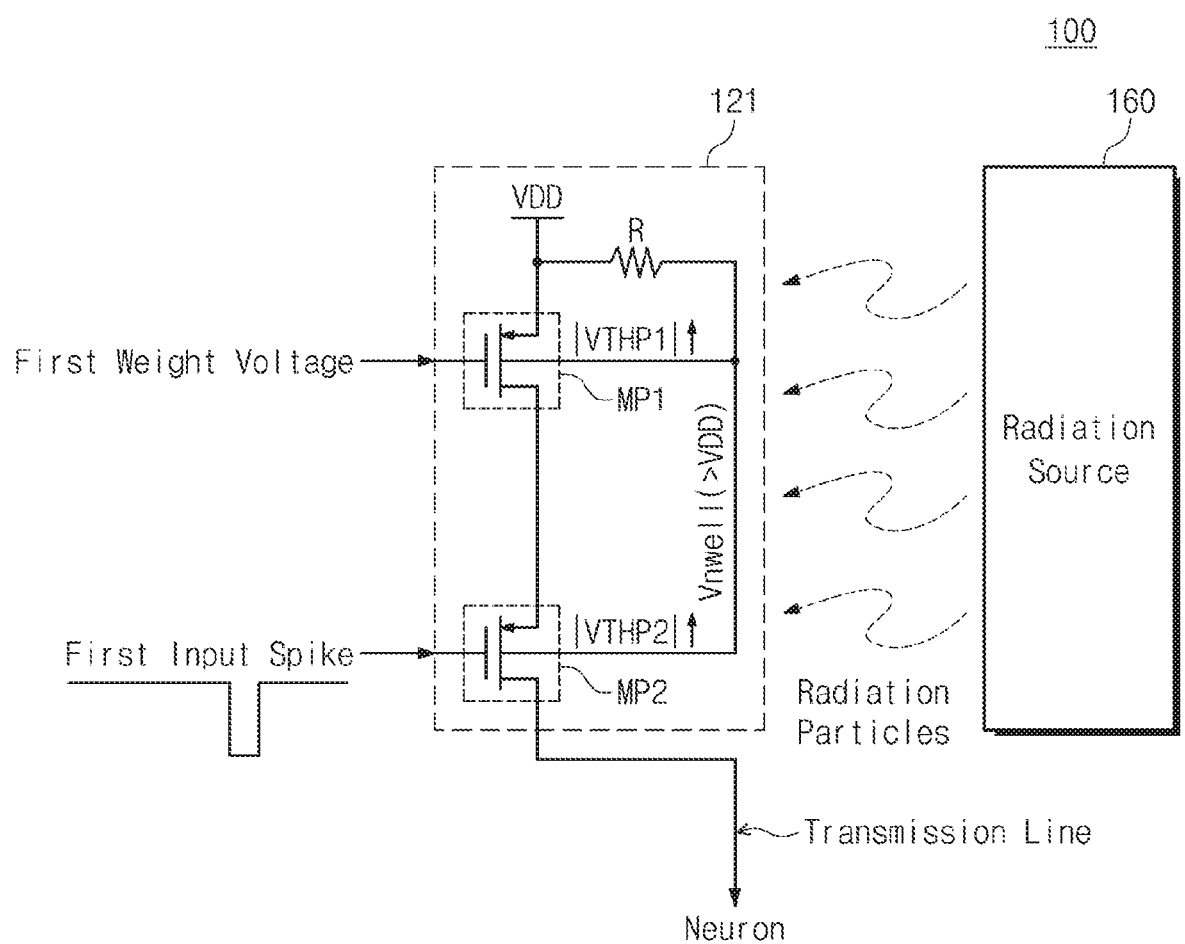
FIG. 6 illustrates a case where the spike neural network circuit of FIG. 2 further includes a radiation source.

FIG. 6 illustrates a case where the spike neural network circuit of FIG. 2 further includes a radiation source. FIG. 6 will be described with reference to FIG. 2. Only the first synapse 121 is shown in FIG. 6 and the illustration of the other components of the spike neural network circuit 100 is omitted. The spike neural network circuit 100 may further include a radiation source 160.

The radiation source 160 may output the radiation particles to the first synapse 121. By radiation particles, the body voltage of the first and second transistors MP1 and MP2 of the first synapse 121 may be set to a high voltage Vnwell higher than the first power supply voltage VDD. The first synapse 121 may further include a resistor R connected between a body of the first and second transistors MP1 and MP2 and a first power supply voltage VDD. Instead of the voltage boosting circuit 150 of FIG. 4, the radiation source 160 may output the radiation particles and increase the magnitudes |VTHP1| and |VTHP2| of the threshold voltages of the first and second transistors MP1 and MP2. Therefore, the leakage current generated in the first and second transistors MP1 and MP2 may be reduced. The computation error that may occur in the operation of comparing the voltage Vcap of the capacitor 141 with the reference voltage may also be reduced.

Figure 7:
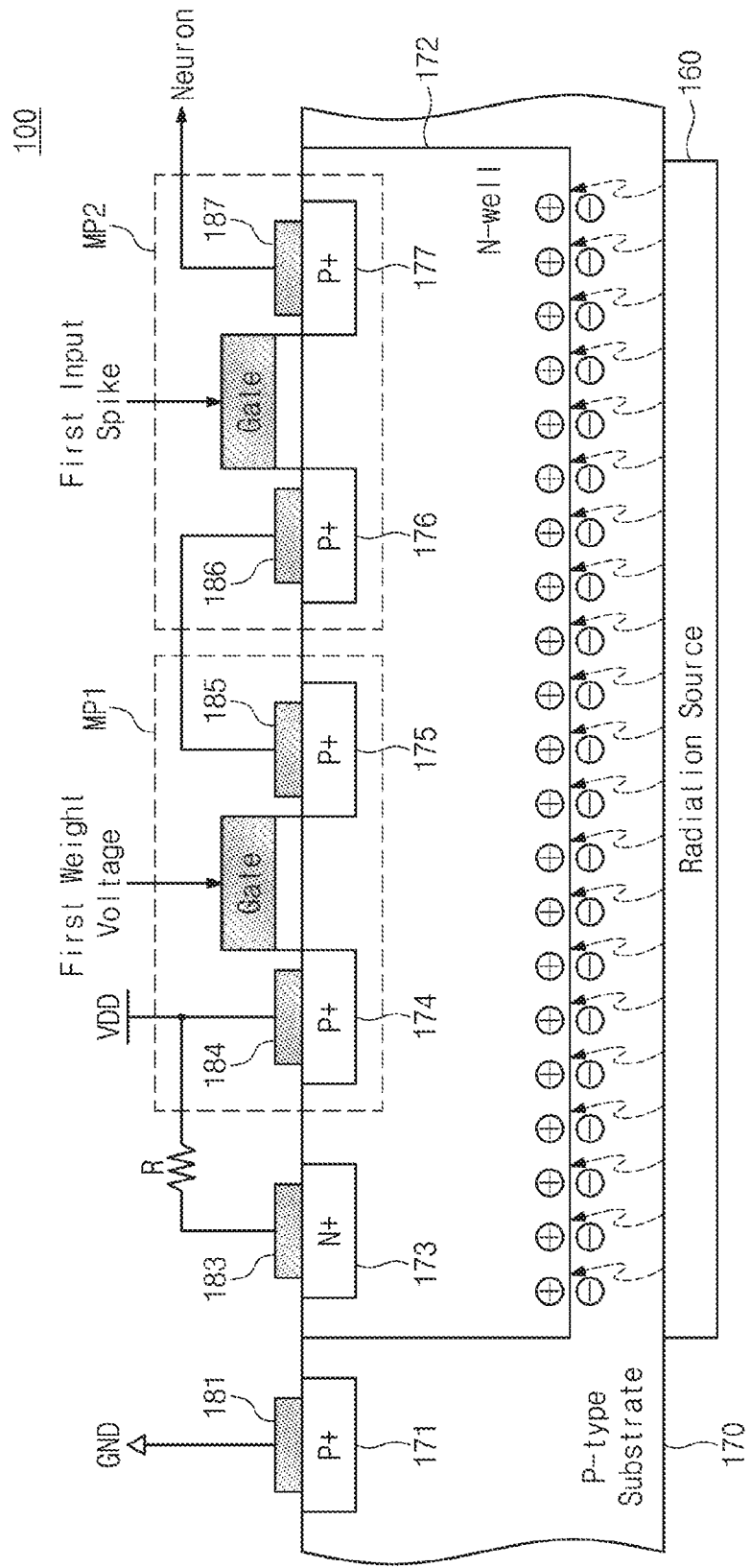
FIG. 7 illustrates a cross-section of the spike neural network circuit of FIG. 6 according to an embodiment.

FIG. 7 illustrates a cross-section of the spike neural network circuit of FIG. 6 according to an embodiment. Hereinafter, the difference between the spike neural network circuit 100 of FIG. 7 and the spike neural network circuit 100 of FIG. 5 will be described.

The radiation source 160 may be attached, doped, combined, or coupled to the bottom surface of the P-type substrate 170. The radiation source 160 may output or project radiation particles in a direction from the bottom (lower) surface of the P-type substrate 170 toward the top (upper) surface of the P-type substrate 170 where the first and second transistors MP1 and MP2 are formed. The top surface of the P-type substrate 170 and the bottom surface of the P-type substrate 170 may be opposite or may face each other. In the PN junction area between the P-type substrate 170 and the N-well area 172, electron-hole pairs may be generated by collision of radiation particles. The electrons of the electron-hole pairs may be located in the P-type substrate 170 and the holes of the electron-hole pairs may be located in the N-well area 172. By the electron-hole pairs, the voltage of the N-well area 172 may increase to a high voltage Vnwell higher than the first power supply voltage VDD, and the magnitudes |VTHP1| and |VTHP2| of the threshold voltages of the first and second transistors MP1 and MP2 may also increase.

In an embodiment, the radiation source 160 may overlap the N-well area 172 in a plan view. The plan view may indicate that the bottom surface of the P-type substrate 170 is viewed from the top surface of the P-type substrate 170 where the first and second transistors MP1 and MP2 are formed.

In an embodiment, the resistor R may be connected between the first power supply voltage VDD and the ohmic contact 183. A current corresponding to a value obtained by dividing the difference between the high voltage Vnwell and the first power supply voltage VDD by the resistance R may flow through the resistor R. For example, as the resistance R becomes larger, the difference between the high voltage Vnwell and the first power supply voltage VDD may increase, and the magnitudes |VTHP1| and |VTHP2| of the threshold voltages of the first and second transistors MP1 and MP2 may also increase.

Figure 8:
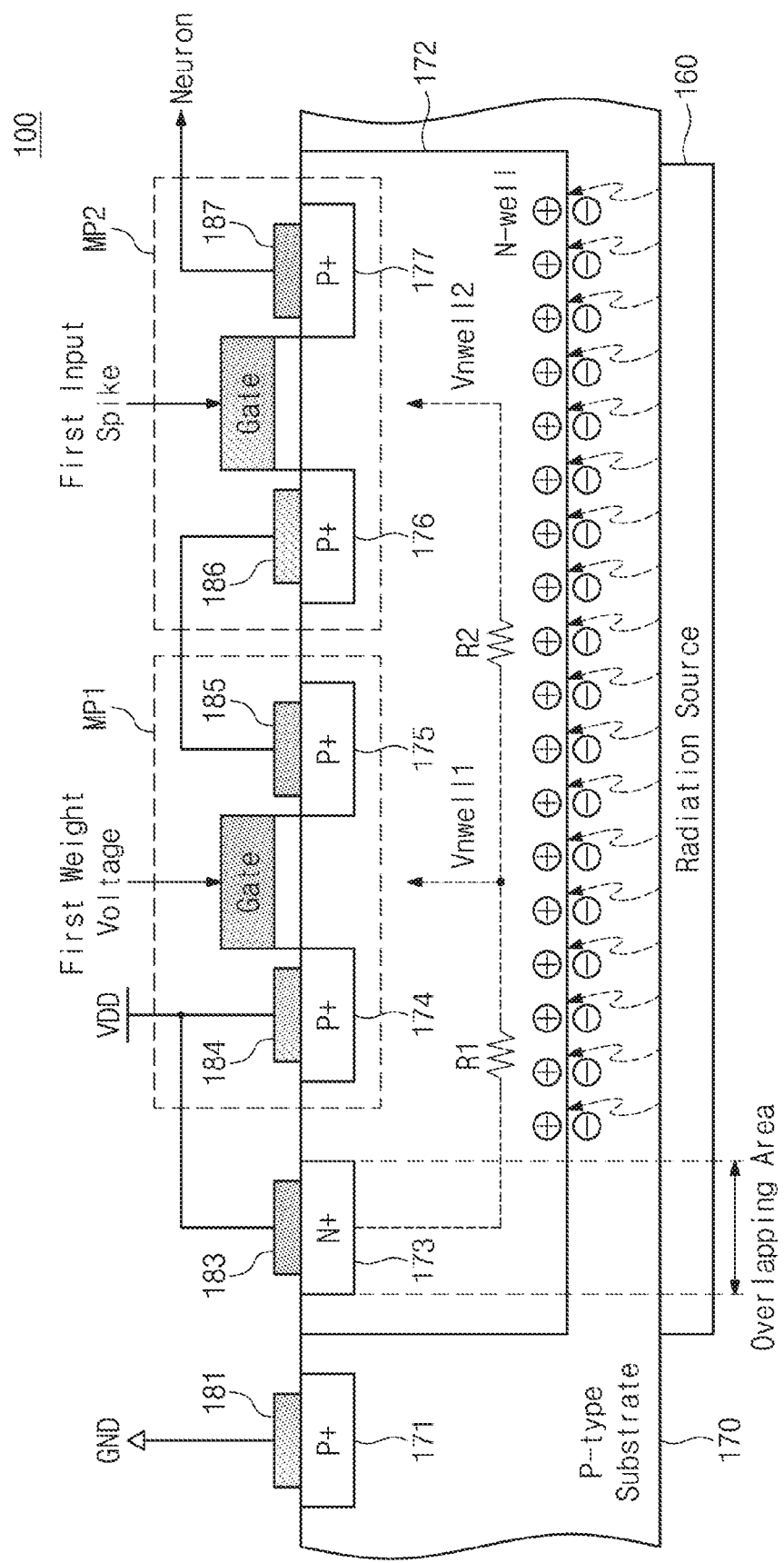
FIG. 8 illustrates a cross-section of the spike neural network circuit of FIG. 6 according to an embodiment.

FIG. 8 illustrates a cross-section of the spike neural network circuit of FIG. 6 according to another embodiment. Hereinafter, the difference between the spike neural network circuit 100 of FIG. 8 and the spike neural network circuit 100 of FIG. 7 will be described.

The N-well area 172 may receive a first power supply voltage VDD through the ohmic contact 183 and the heavily doped N-type diffusion area 173. The spike neural network circuit 100 of FIG. 8 may not include the resistor R described above with reference to FIG. 7. Instead, electron-hole pairs generated by the radiation source 160 overlaps the first and second transistors MP1 and MP2 and does not overlap the heavily doped N-type diffusion area 173 and the ohmic contact 183 in the plan view. In the plan view, due to the resistance of the overlapping area of the N-well area 172 overlapping the ohmic contact 183 and the heavily doped N-type diffusion area 173, the voltage of the N-well area 172 may be set to a high voltage Vnwell higher than the first power supply voltage VDD. The resistors R1 and R2 may represent the resistance component of the N-well area 172 itself. The resistor R1 may represent the resistance of the N-well area 172 corresponding to the distance between the heavily doped N-type diffusion area 173 and the first transistor MP1, and the resistor R2 may represent the resistance of the N-well area 172 corresponding to the distance between the first transistor MP1 and the second transistor MP2.

For example, the body voltage of the first transistor MP1 may be set to the first high voltage Vnwell1 due to the resistance of the overlapping area of the N-well area 172 and the resistance R1, and the body voltage of the second transistor MP2 may be set to the second high voltage Vnwell2 due to the resistance of the overlapping area of the N-well area 172, the resistor R1, and the resistor R2. The second high voltage Vnwell2 may be higher than the first high voltage Vnwell1 and the first high voltage Vnwell1 may be higher than the first power supply voltage VDD. The magnitude |VTHP2| of the threshold voltage of the second transistor MP2 may be greater than the magnitude |VTHP1| of the threshold voltage of the first transistor MP1.

Examples in which the synapse circuit 120 of FIG. 1 is implemented using PMOSs are described with reference to FIGS. 2 to 8. Hereinafter, examples in which the synapse circuit 120 of FIG. 1 is implemented using NMOSs will be described.

Figure 9:
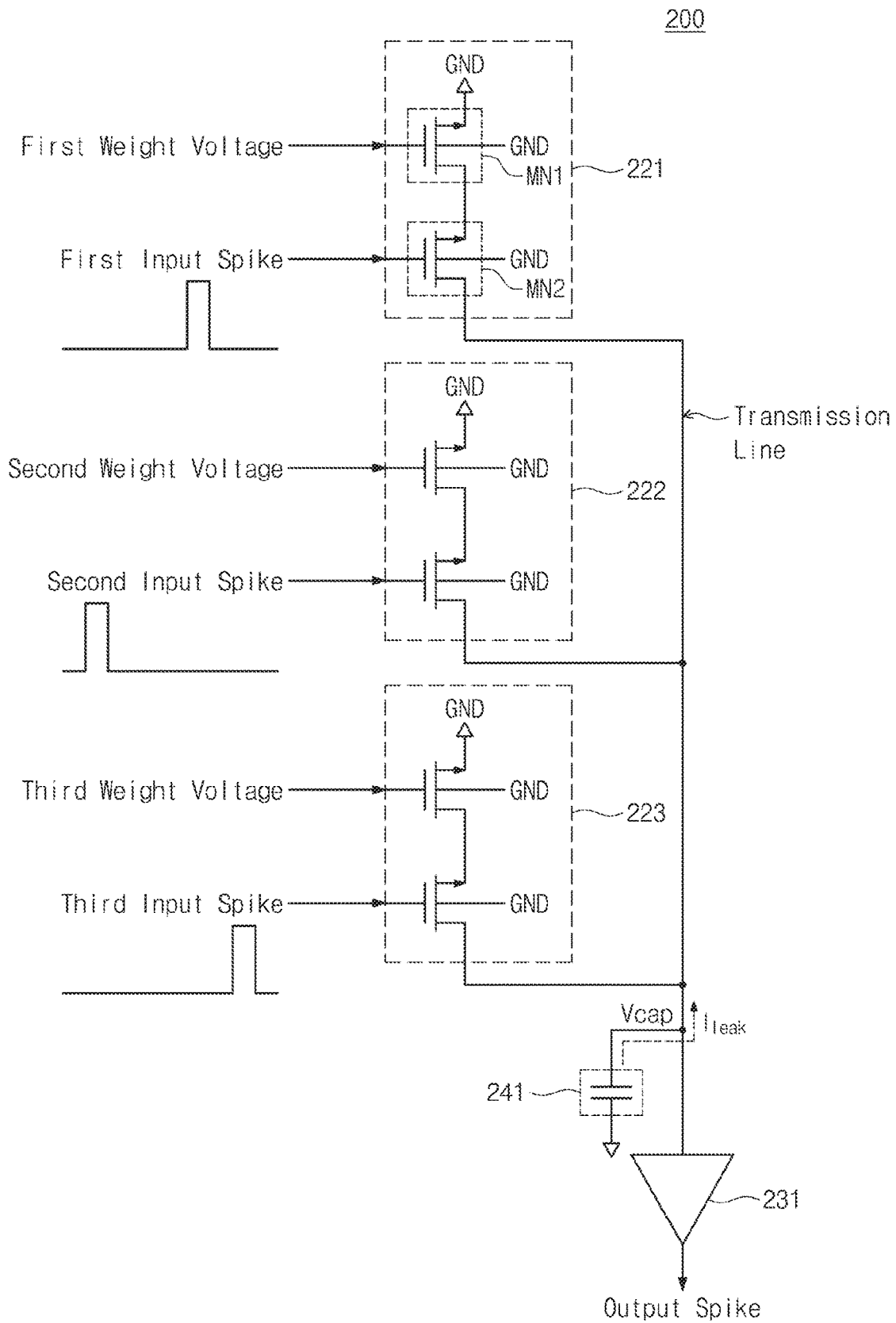
FIG. 9 is a block diagram that more specifically illustrates synapses of the synapse circuit of FIG. 1 according to another embodiment.

FIG. 9 is a block diagram that more specifically illustrates synapses of the synapse circuit of FIG. 1 according to another embodiment. FIG. 9 will be described with reference to FIG. 1. Except that the synapses of the spike neural network circuit 200 are implemented using NMOSs rather than PMOSs, the spike neural network circuit 200 may be implemented and operated similarly to the spike neural network circuit 100 of FIG. 1.

The first synapse 221 may include a first transistor MN1 and a second transistor MN2. The first transistor MN1 may receive the first weight voltage through the gate terminal. The first transistor MN1 may be connected to a second power supply voltage GND through a source terminal. The drain terminal of the first transistor MN1 may be connected to the source terminal of the second transistor MN2. The first transistor MN1 may be a current source that outputs a current to a second power supply voltage GND according to a first weight voltage. The amount of current flowing through the first transistor MN1 may correspond to the first weight of the first synapse 221.

The second transistor MN2 may receive the first input spike signal through the gate terminal. The source terminal of the second transistor MN2 may be connected to the drain terminal of the first transistor MN1. The drain terminal of the second transistor MN2 may be connected to the transmission line. The second transistor MN2 may be a switch that is turned on or off depending on the first input spike signal.

Each of the first transistor MP1 and the second transistor MP2 may be an n-channel metal-oxide semiconductor (NMOS). When the signal input to the gate terminal has a relatively high voltage level, each of the first transistor MN1 and the second transistor MN2 may be turned on, and when the signal input to the gate terminal has a relatively low voltage level, may be turned off. The body terminal or the bulk terminal of each of the first transistor MN1 and the second transistor MN2 may be connected to the second power supply voltage GND.

In an embodiment, the spike neural network circuit 200 may include a charge circuit (not shown) that charges the capacitor 241 periodically or aperiodically. Before the first to third weights are output from the capacitor 241 to the first to third synapses 221 to 223 according to the first to third input spike signals, the charge circuit may charge the capacitor 241 fully.

The first to third synapses 121 to 123 of FIG. 2 output current from the first power supply voltage VDD to the capacitor 141, but the first to third synapses 221 to 223 of FIG. 9 may output current from the fully charged capacitor 241 to the second power supply voltage GND and discharge the capacitor 241. The capacitor 241 may be discharged from the first to third synapses 221 to 223 to the second power supply voltage GND and discharged by the currents corresponding to the first to third weights. The voltage Vcap of the capacitor 241 may be a value according to the currents output from the first to third synapses 221 to 223 to the second power supply voltage GND, and may be a value determined by the first to third weights output from the first to third synapses 221 to 223 according to the first to third input spike signals. The voltage Vcap of the capacitor 241 may be provided to the neuron 231.

Referring to FIG. 9, the first to third input spike signals may have a relatively high voltage level for a relatively short section (time) and a relatively low voltage level for a remaining section (time). During a section where the first to third spike signals are not activated (i.e., during a section where the first to third input spike signals have relatively low voltage levels), the second transistors of the first to third synapses 221 to 223 may be turned off.

Since the second transistors of the first to third synapses 221 to 223 have a finite resistance value in the turn-off state, the capacitor 241 may be discharged by the leakage current Ileak output from the second transistors of the first to third synapses 221 to 223. The leakage current Ileak may be smaller than the sum of the currents corresponding to the first to third weights. However, the leakage current Ileak may affect the voltage Vcap of the capacitor 241 and decrease the voltage Vcap of the capacitor 241. As the number of synapses connected to the transmission line increases, the leakage current Ileak may also increase. A computation error may occur in the spike neural network circuit 200 due to the leakage current Ileak. The spike neural network circuit 200 of the inventive concept may reduce the leakage current Ileak occurring in the synapses and minimize the computation error.

Figure 10:
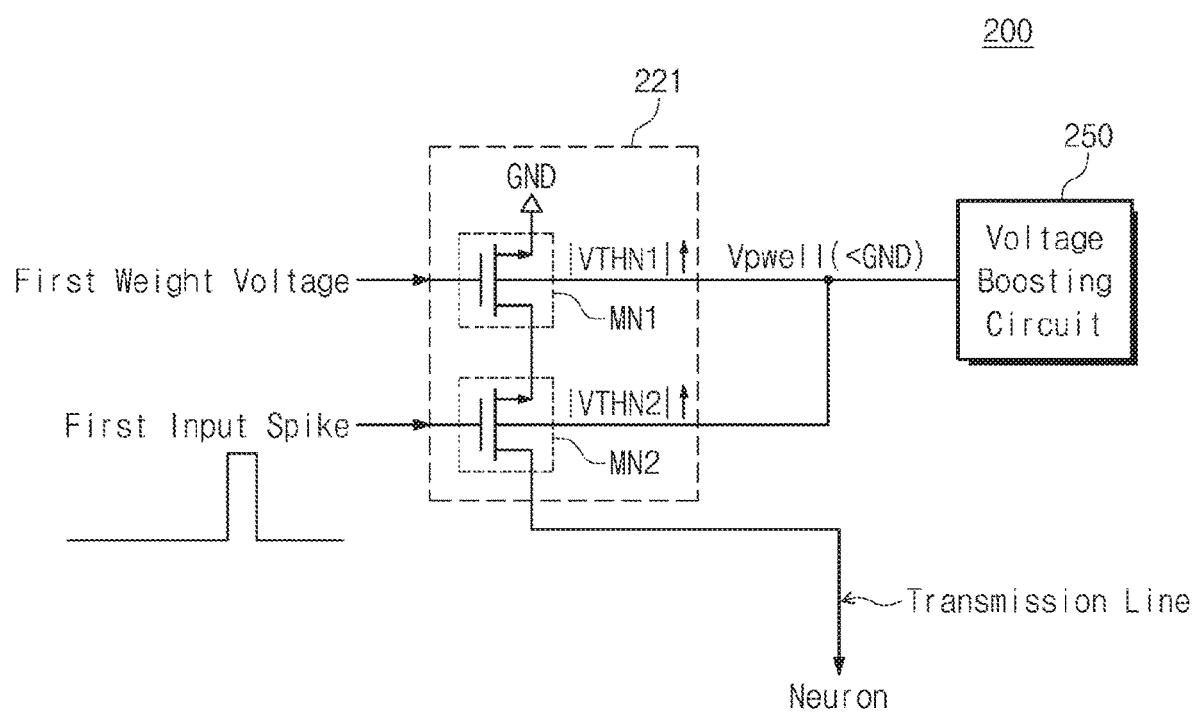
FIG. 10 illustrates a case where the spike neural network circuit of FIG. 9 further includes a voltage boosting circuit.

FIG. 10 illustrates a case where the spike neural network circuit of FIG. 9 further includes a voltage boosting circuit. Only the first synapse 221 is shown in FIG. 10 and the illustration of the other components of the spike neural network circuit 200 is omitted. FIG. 10 will be described with reference to FIG. 9. The spike neural network circuit 200 may further include a voltage boosting circuit 250.

The voltage boosting circuit 250 may generate a low voltage Vpwell lower than the second power supply voltage GND. The voltage boosting circuit 250 may include a charge pump that generates a low voltage Vpwell. The low voltage Vnwell may be provided to the body terminals of the first and second transistors MN1 and MN2 of the first synapse 221. The magnitudes |VTHN1| and |VTHN2| of the threshold voltages of the first and second transistors MN1 and MN2 when the body voltage of the first and second transistors MN1 and MN2 is a low voltage Vpwell may be greater than the magnitudes |VTHN1| and |VTHN2| of the threshold voltages of the first and second transistors MN1 and MN2 when the body voltage of the first and second transistors MN1 and MN2 is the second power supply voltage GND. The voltage boosting circuit 250 may increase the magnitudes |VTHN1| and |VTHN2| of the threshold voltages of the first and second transistors MN1 and MN2 by using or by supplying the low voltage Vpwell. Therefore, the leakage current generated in the first and second transistors MN1 and MN2 may be reduced. The computation error that may occur in the operation of comparing the voltage Vcap of the capacitor 241 with the reference voltage may also be reduced.

Figure 11:
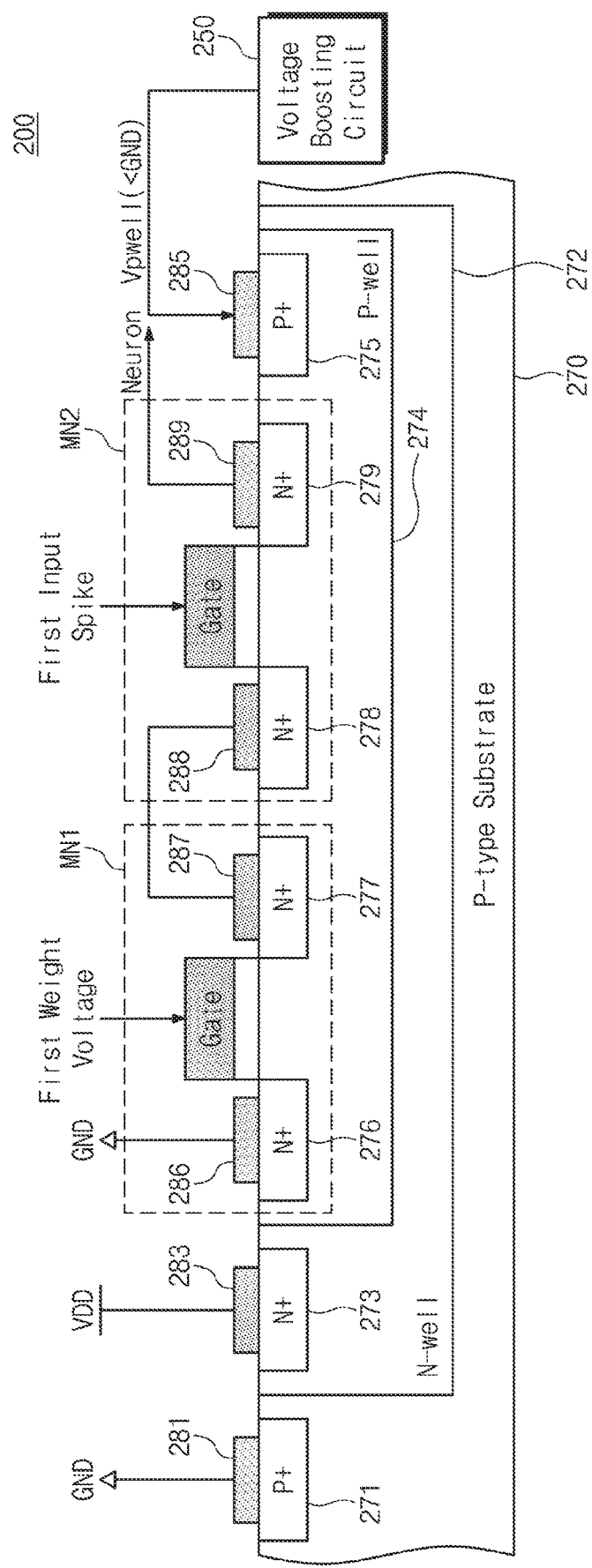
FIG. 11 illustrates a cross-section of the spike neural network circuit of FIG. 10.

FIG. 11 illustrates a cross-section of the spike neural network circuit of FIG. 10. The first transistor MN1, the second transistor MN2 and the voltage boosting circuit 250 of the spike neural network circuit 200 may be implemented in the P-type substrate 270.

A P-type dopant may be doped in the P-type substrate 270. A heavily doped P-type diffusion area 271 may be formed in the P-type substrate 270. An ohmic contact 281 may be formed on the heavily doped P-type diffusion area 271. The P-type substrate 270 may receive a second power supply voltage GND through the heavily doped P-type diffusion area 271 and the ohmic contact 281. An N-well area 272 may be formed in the P-type substrate 270. An N-type dopant may be doped in the N-well area 272. A heavily doped N-type diffusion area 273 may be formed in the N-well area 272. An ohmic contact 283 may be formed on the heavily doped N-type diffusion area 273. The N-well area 272 may receive a first power supply voltage VDD through the heavily doped N-type diffusion area 273 and the ohmic contact 283. The P-well area 274 may be formed in the N-well area 272. The N-well area 272 may cover or surround the P-well area 274. A P-type dopant may be doped in the P-well area 274. A heavily doped P-type diffusion area 275 may be formed in the P-well area 274. An ohmic contact 285 may be formed on the heavily doped P-type diffusion area 275. The P-well area 274 may receive a low voltage Vpwell lower than the second power supply voltage GND through the heavily doped P-type diffusion area 275 and the ohmic contact 285. The low voltage Vpwell of the P-well area 274 may increase the magnitudes |VTHN1| and |VTHN2| of the threshold voltages of the first and second transistors MN1 and MN2.

Heavily doped N-type diffusion areas 276 to 279 may be formed in the P-well area 274. Ohmic contacts 286 to 289 may be formed on the heavily doped N-type diffusion areas 276 to 279, respectively. Polysilicon operating as a gate terminal may be formed on the P-type substrate 270 between the heavily doped N-type diffusion areas 276 and 277. A layer of silicon dioxide ($SiO_2$) for separating the gate terminal from the P-type substrate 270 may be formed between the gate terminal and the P-type substrate 270. The heavily doped N-type diffusion areas 276 and 277, the ohmic contacts 286 and 287, a layer of silicon dioxide ($SiO_2$), and a gate terminal may configure a first transistor MN1. Similarly, the heavily doped N-type diffusion areas 278 and 279, the ohmic contacts 288 and 289, a layer of silicon dioxide ($SiO_2$), and a gate terminal may configure a second transistor MN2.

As described with reference to FIG. 9, a second power supply voltage GND is provided to the ohmic contact 286 operating as the source terminal of the first transistor MN1. The ohmic contact 287 operating as the drain terminal of the first transistor MN1 and the ohmic contact 288 operating as the source terminal of the second transistor MN2 are electrically connected to each other through wiring. The ohmic contact 289 operating as the drain terminal of the second transistor MN2 may be electrically connected to the transmission lines of FIGS. 9 and 10.

Figure 12:
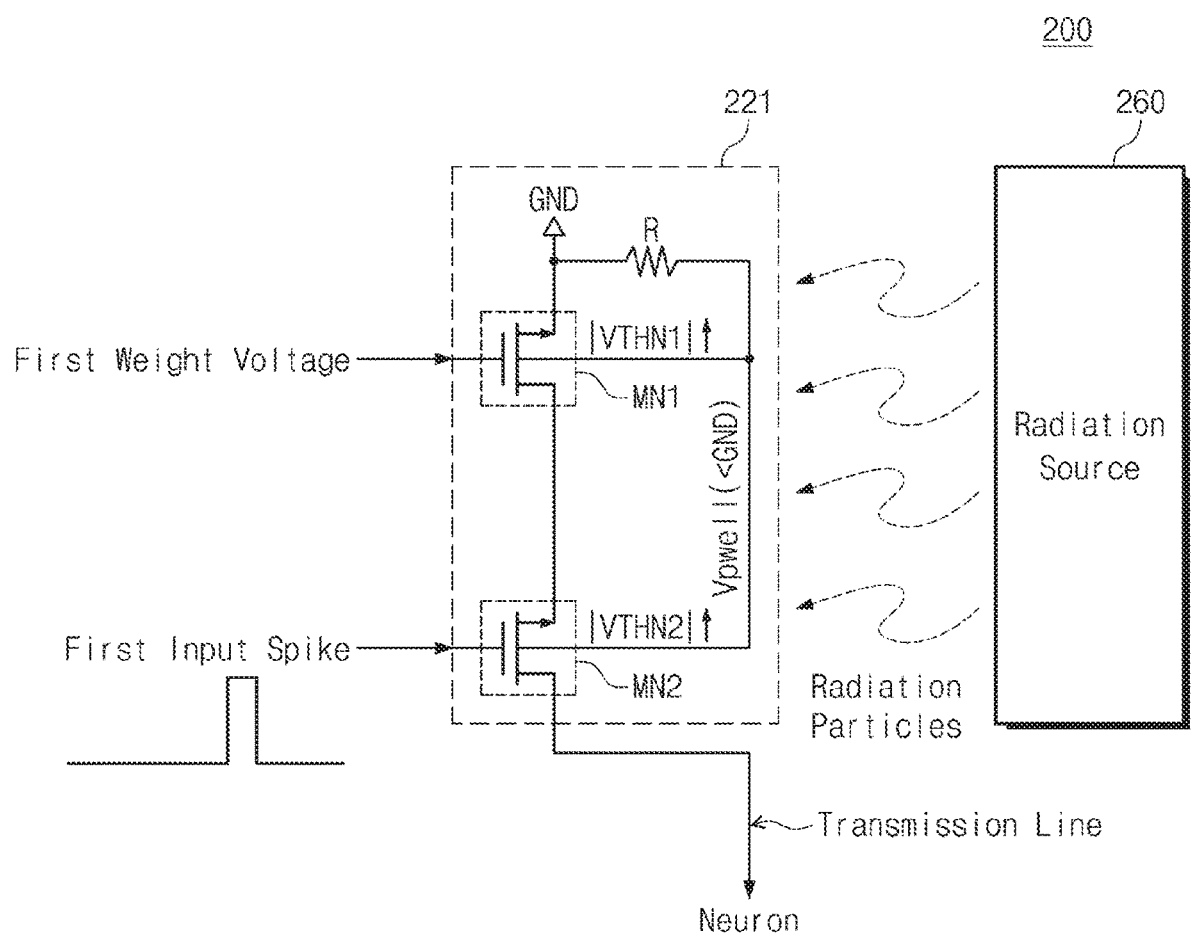
FIG. 12 illustrates a case where the spike neural network circuit of FIG. 9 further includes a radiation source.

FIG. 12 illustrates a case where the spike neural network circuit of FIG. 9 further includes a radiation source. Only the first synapse 221 is shown in FIG. 12 and the illustration of the other components of the spike neural network circuit 200 is omitted. FIG. 12 will be described with reference to FIG. 9. The spike neural network circuit 200 may further include a radiation source 260.

The radiation source 260 may output and project the radiation particles to the first synapse 221. By radiation particles, the body voltage of the first and second transistors MN1 and MN2 of the first synapse 221 may be set to a low voltage Vpwell lower than the second power supply voltage GND. The first synapse 221 may further include a resistor R connected between a body of the first and second transistors MN1 and MN2 and a second power supply voltage GND. Instead of the voltage boosting circuit 250 of FIG. 10, the radiation source 260 may output the radiation particles and increase the magnitudes |VTHN1| and |VTHN2| of the threshold voltages of the first and second transistors MN1 and MN2. Therefore, the leakage current generated in the first and second transistors MN1 and MN2 may be reduced. The computation error that may occur in the operation of comparing the voltage Vcap of the capacitor 241 with the reference voltage may also be reduced.

Figure 13:
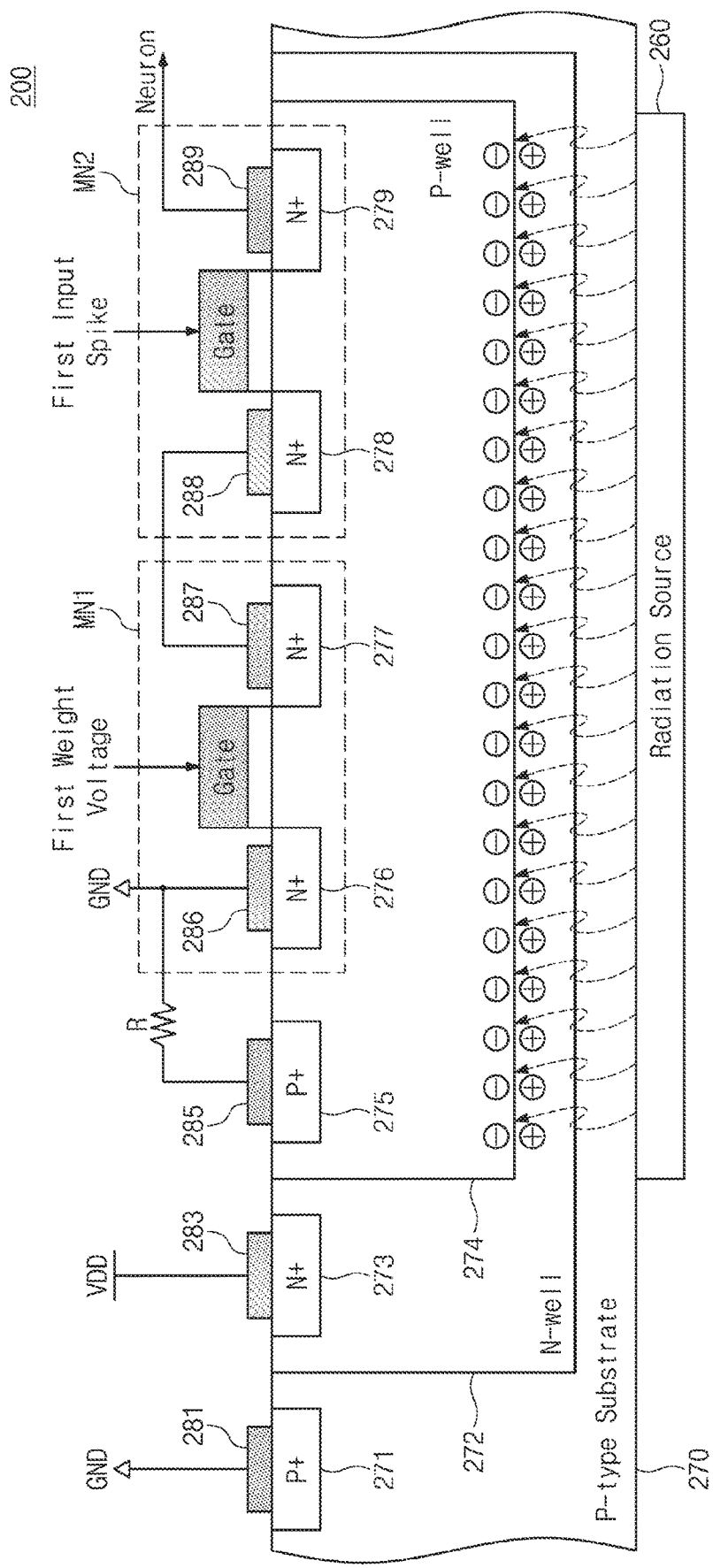
FIG. 13 illustrates a cross-section of the spike neural network circuit of FIG. 12 according to an embodiment.

FIG. 13 illustrates a cross-section of the spike neural network circuit of FIG. 12 according to an embodiment. Hereinafter, the difference between the spike neural network circuit 200 of FIG. 11 and the spike neural network circuit 200 of FIG. 13 will be described.

The radiation source 260 may be attached or doped to the bottom surface of the P-type substrate 270. The radiation source 260 may output radiation particles in a direction from the bottom surface of the P-type substrate 270 toward the top surface of the P-type substrate 270 where the first and second transistors MN1 and MN2 are formed. In the PN junction area between the N-well area 272 and the P-well area 274, electron-hole pairs may be generated by collision of radiation particles. The holes of the electron-hole pairs may be located in the N-well area 272 and the electrons of the electron-hole pairs may be located in the P-well area 274. By the electron-hole pairs, the voltage of the P-well area 274 may decrease to a low voltage Vpwell lower than the second power supply voltage GND, and the magnitudes |VTHN1| and |VTHN2| of the threshold voltages of the first and second transistors MN1 and MN2 may increase.

In the PN junction area between the P-type substrate 270 and the N-well area 272, electron-hole pairs may be generated by collision of radiation particles. However, the second power supply voltage GND provided through the ohmic contact 281 and a heavily doped P-type diffusion area 271 and the first power supply voltage VDD provided through the ohmic contact 283 and the heavily doped N-type diffusion area 273 may absorb electron-hole pairs of the PN junction area between the P-type substrate 270 and the N-well area 272.

In an embodiment, the radiation source 260 may overlap the P-well area 274 in a plan view. In addition, the resistor R may be connected between the second power supply voltage GND and the ohmic contact 285. A current corresponding to a value obtained by dividing the difference between the second power supply voltage GND and the low voltage Vpwell by the resistance R may flow through the resistor R. As the resistance R becomes larger, the difference between the low voltage Vpwell and the first power supply voltage VDD may increase, and the magnitudes |VTHN1| and |VTHN2| of the threshold voltages of the first and second transistors MN1 and MN2 may also increase.

Figure 14:
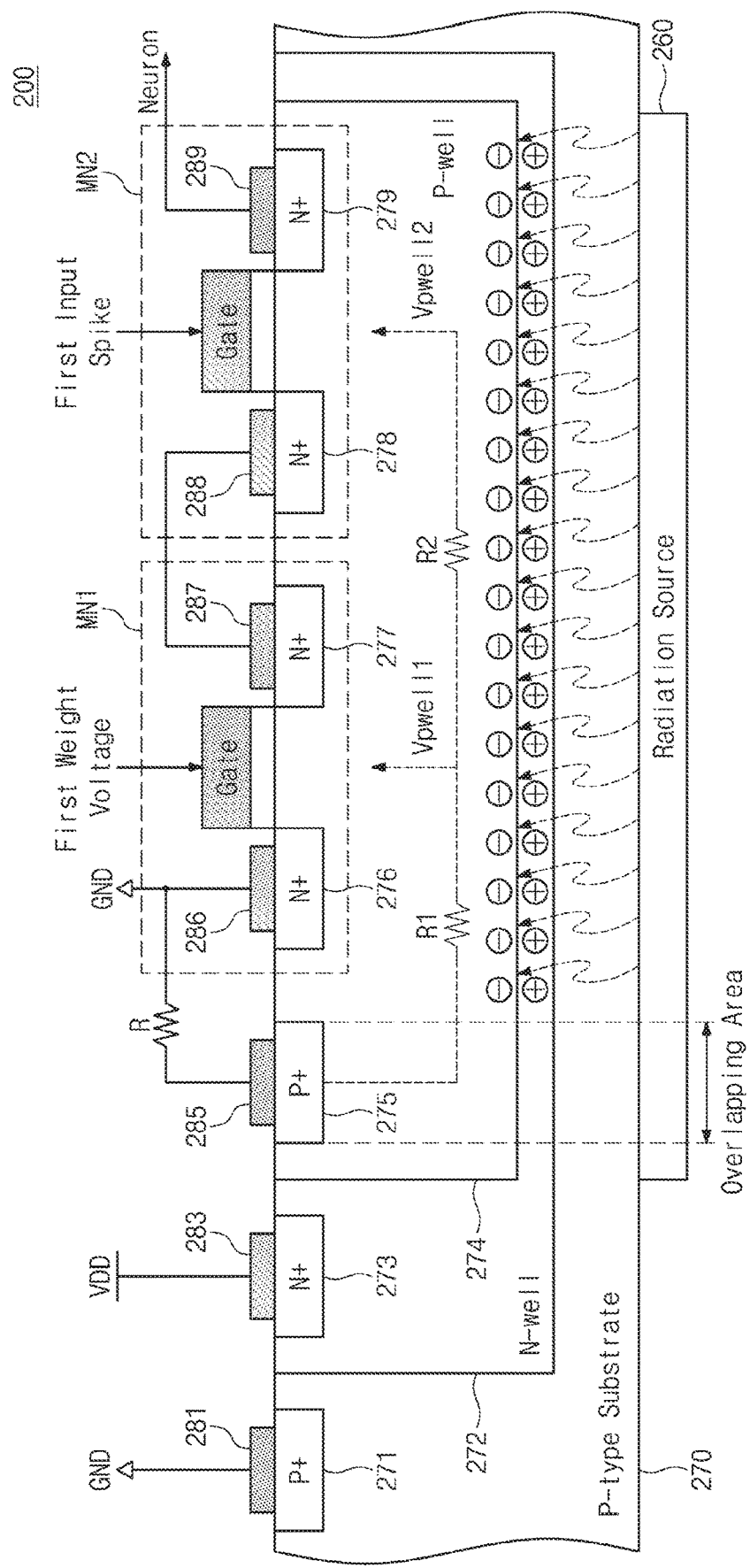
FIG. 14 illustrates a cross-section of the spike neural network circuit of FIG. 12 according to another embodiment.

FIG. 14 illustrates a cross-section of the spike neural network circuit of FIG. 12 according to another embodiment. Hereinafter, the difference between the spike neural network circuit 200 of FIG. 14 and the spike neural network circuit 200 of FIG. 13 will be described.

The P-well area 274 may receive a second power supply voltage GND through the ohmic contact 285 and the heavily doped P-type diffusion area 275. The spike neural network circuit 200 of FIG. 14 may not include the resistor R described above with reference to FIG. 13. Instead, electron-hole pairs generated by the radiation source 260 overlaps the first and second transistors MN1 and MN2 and does not overlap the ohmic contact 285 and the heavily doped P-type diffusion area 275 in a plan view. In a plan view, due to the resistance of the overlapping area of the P-well area 274 overlapping the ohmic contact 285 and the heavily doped P-type diffusion area 275, the voltage of the P-well area 274 may be set to a low voltage Vpwell lower than the second power supply voltage GND. The resistors R3 and R4 may represent the resistance component of the P-well area 274 itself. The resistor R3 may represent the resistance of the P-well area 274 corresponding to the distance between the heavily doped P-type diffusion area 275 and the first transistor MN1, and the resistor R4 may represent the resistance of the P-well area 274 corresponding to the distance between the first transistor MN1 and the second transistor MN2.

For example, the body voltage of the first transistor MN1 may be set to the first low voltage Vpwell1 due to the resistance of the overlapping area of the P-well area 274 and the resistance R3, and the body voltage of the second transistor MN2 may be set to the second low voltage Vpwell2 due to the resistance of the overlapping area of the P-well area 274, the resistor R3, and the resistor R4. The second low voltage Vpwell2 may be lower than the first low voltage Vpwell1 and the first low voltage Vpwell1 may be lower than the second power supply voltage GND. The magnitude |VTHN2| of the threshold voltage of the second transistor MN2 may be greater than the magnitude |VTHN1| of the threshold voltage of the first transistor MN1.

Figure 15:
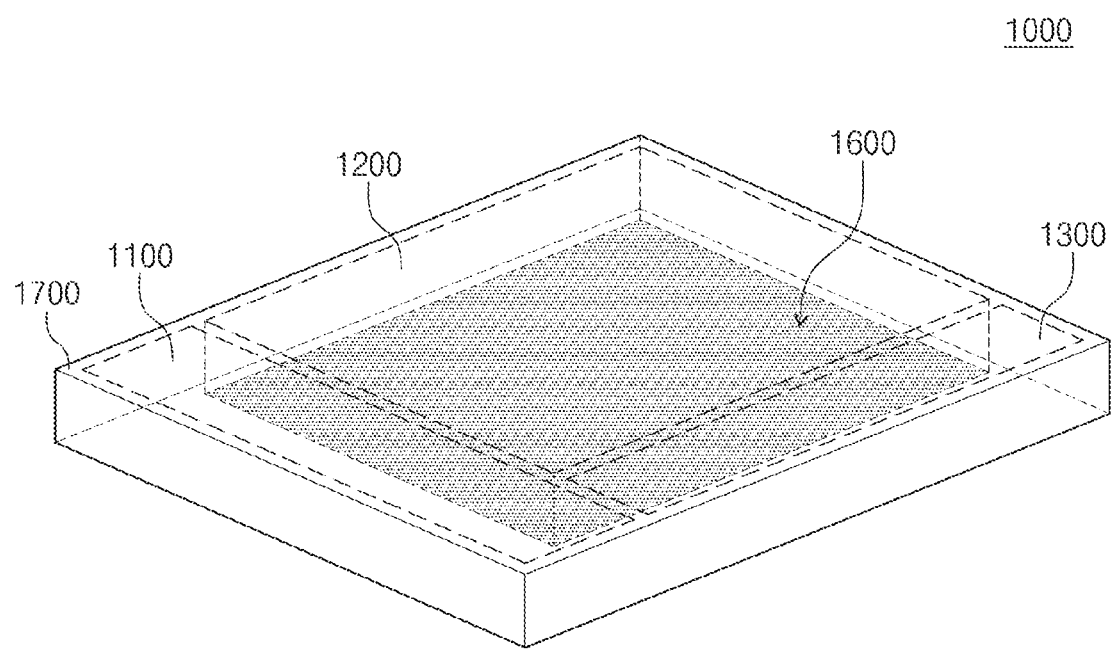
FIG. 15 illustrates a spike neural network circuit of the inventive concept in three dimensions.

FIG. 15 illustrates a spike neural network circuit of the inventive concept in three dimensions. The spike neural network circuit 1000 may include an axon circuit 1100, a synapse circuit 1200, and a neuron circuit 1300 formed in a substrate 1700. The spike neural network circuit 1000 may be the spike neural network circuits 100 and 200, the axon circuit 1100 may be the above-described axon circuit 110, the synapse circuit 1200 may be the above-described synapse circuit 120, and the neuron circuit 1300 may be the above-described neuron circuit 130. The substrate 1700 may be the P-type substrates 170 and 270 described above.

In an embodiment, the axon circuit 1100, the synapse circuit 1200, and the neuron circuit 1300 may be formed on the top surface of the substrate 1700 and the radiation source 1600 may be formed on the bottom surface of the substrate 1700. The radiation source 1600 may be the radiation sources 160, 260 described above. The radiation source 1600 may overlap the synapse circuit 1200 in a plan view. The area of synapse circuit 1200 may be wider than the areas of other components of the spike neural network circuit 1000. The radiation source 1600 may not overlap the axon circuit 1100 and the neuron circuit 1300 in addition to the synapse circuit 1200 in a plan view.

The spike neural network circuit according to an embodiment of the inventive concept may include a radiation source. The radiation source outputs a radiation particle, which may increase the magnitude of the threshold voltage of the transistors in the spike neural network. Since the leakage current of the transistors may be reduced, the computation error of the spike neural network circuit due to the leakage current may be minimized.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:

1. A spike neural network circuit comprising:
   an axon configured to generate an input spike signal;
   a synapse comprising a first transistor configured to output a current depending on a weight and a second transistor connected to the first transistor and configured to output the current depending on the input spike signal;
   a neuron configured to compare a value according to the current output from the synapse with a reference value and generate an output spike signal based on a comparison result; and
   a radiation source attached to a substrate in which the synapse is formed and configured to output radiation particles to the synapse and increase magnitudes of threshold voltages of the first and second transistors of the synapse.

2. The spike neural network circuit of claim 1, further comprising a capacitor charged by the current output from the synapse,
   wherein the value according to the current is a voltage of the capacitor, and
   wherein each of the first and second transistors of the synapse is a PMOS and is formed in an N-well area.

3. The spike neural network circuit of claim 2, wherein electron-hole pairs are generated in a junction area of the substrate and the N-well area by the radiation particles, and holes of the electron-hole pairs are located in the N-well area.

4. The spike neural network circuit of claim 3, wherein the N-well area is connected to a first power supply voltage through an N-type diffusion area, an ohmic contact, and a resistor connected to the ohmic contact, and a voltage of the N-well area is higher than the first power supply voltage by the resistor.

5. The spike neural network circuit of claim 3, wherein the N-well area is connected to a first power supply voltage through an N-type diffusion area and an ohmic contact,
   wherein the electron-hole pairs generated by the radiation particles overlaps the first and second transistors in a plan view and do not overlap the N-type diffusion area in a plan view, and
   wherein a voltage of the N-well area is higher than the first power supply voltage by a resistance of an overlapping area of the N-well area overlapping the N-type diffusion area in a plan view.

6. The spike neural network circuit of claim 1, further comprising a capacitor discharged by the current output from the synapse,
   wherein the value according to the current is a voltage of the capacitor, and
   wherein each of the first and second transistors of the synapse is an NMOS and is formed in a P-well area.

7. The spike neural network circuit of claim 6, wherein electron-hole pairs are generated by the radiation particles in a junction area between an N-well area surrounding the P-well area and the P-well area, and wherein electrons of the electron-hole pairs are located in the P-well area.

8. The spike neural network circuit of claim 7, wherein the P-well area is connected to a second power supply voltage through a P-type diffusion area, an ohmic contact, and a resistor connected to the ohmic contact, and a voltage of the P-well area is lower than the second power supply voltage by the resistor.

9. The spike neural network circuit of claim 7, wherein the P-well area is connected to a second power supply voltage through a P-type diffusion area and an ohmic contact, wherein the electron-hole pairs generated by the radiation particles overlaps the first and second transistors in a plan view and do not overlap the ohmic contact in a plan view, and wherein a voltage of the P-well area is lower than the second power supply voltage by a resistance of an overlapping area of the P-well area overlapping the P-type diffusion area in a plan view.

10. The spike neural network circuit of claim 1, wherein the weight represents a correlation between the axon and the neuron.

11. The spike neural network circuit of claim 1, wherein the radiation source overlaps the synapse and the radiation source does not overlap the axon and the neuron in a plan view.

12. A spike neural network circuit comprising:
an axon circuit configured to generate a plurality of input spike signals;
a synapse circuit comprising transistors configured to output a plurality of weights depending on the plurality of input spike signals;
a neuron circuit configured to compare a value determined by the weights output from the synapse circuit with a reference value and generate output spike signals based on a comparison result; and
a radiation source attached to a substrate in which the synapse circuit is formed and configured to output radiation particles to the synapse circuit and increase magnitudes of threshold voltages of the transistors of the synapse circuit.

13. The spike neural network circuit of claim 12, wherein the transistors of the synapse circuit are turned on depending on the plurality of input spike signals and output currents corresponding to the plurality of weights, and wherein the transistors of the synapse circuit are turned off depending on the plurality of input spike signals.

14. The spike neural network circuit of claim 13, further comprising a capacitor charged or discharged by the currents corresponding to the plurality of weights.

15. The spike neural network circuit of claim 12, wherein the synapse circuit is formed on a first surface of the substrate, and wherein the radiation source is attached to a second surface facing the first surface of the substrate and overlaps the synapse circuit in a plan view, and wherein the radiation source outputs the radiation particles in a direction from the second surface to the first surface.

\* \* \* \* \*